May 28, 1946.    R. G. JEWELL    2,401,160
PULL-OFF MAGNET
Filed Jan. 7, 1944
Fig.1.
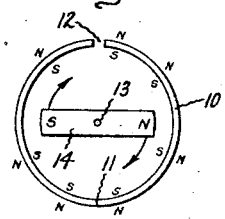
Fig.2.
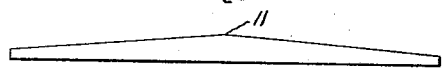
Fig.3.
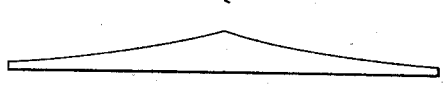
Fig.3a.
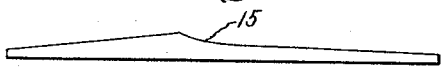
Fig.4.
Fig.6.
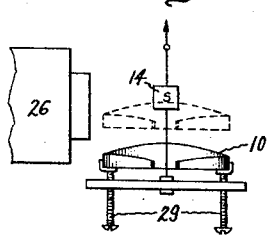
Fig.7.
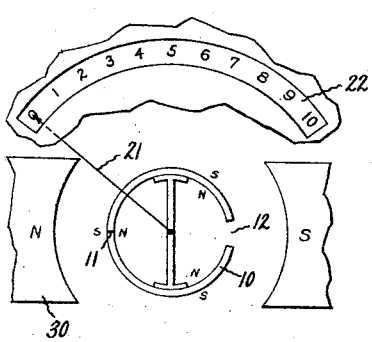
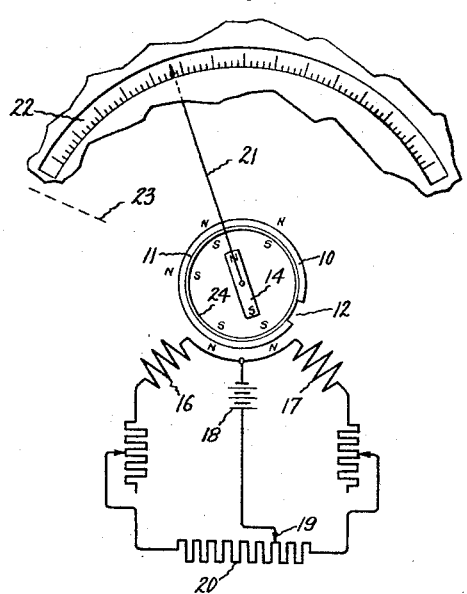
Fig.5.
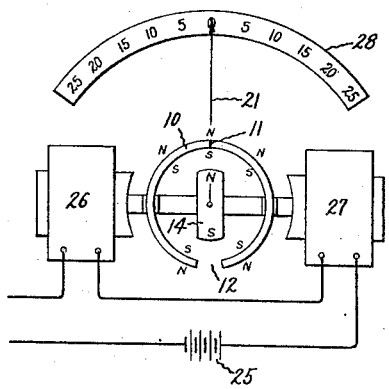
Inventor:
Richard G. Jewell,
by Harry E. Dunham
His Attorney.

Patented May 28, 1946

2,401,160

UNITED STATES PATENT OFFICE 2,401,160

PULL-OFF MAGNET

Richard G. Jewell, Swampscott, Mass., assignor to General Electric Company, a corporation of New York Application January 7, 1944, Serial No. 517,419

9 Claims. (Cl. 171—95)

My invention relates to auxiliary magnetic torque producing arrangements particularly designed to be used with indicating instruments for moving the indicating pointer off-scale to prevent a false indication when the instrument is deenergized or to produce a zero return torque, etc.

The features of my invention which are believed to be novel and patentable will be pointed out in the claims appended hereto. For a better understanding of my invention, reference is made in the following description to the accompanying drawing in which Fig. 1 shows a plan view of the auxiliary torque producing unit; Figs. 2, 3, and 3a are side views of strips of permanent magnet material used before being bent into a circular form; Fig. 4 shows the application of my invention to provide the zero return and pull-off torque of a differential electrical measuring instrument; Figs. 5 and 6 are plan and partial side views of a zero center scale instrument to which my invention is applied; and Fig. 7 represents my invention where the C-shaped magnet of my invention is on the shaft of an instrument of the stationary permanent type.

In Fig. 1, 10 represents a sector-shaped permanent magnet which may be formed by taking a strip of suitable permanent magnet material such as shown in Fig. 2, and bending it into the form of a nearly closed, relatively thin circular band, as shown in Fig. 1. The strip will preferably have a uniform thickness but will vary in height. The strip shown in Fig. 2 has its greatest height at the center 11 and tapers uniformly toward its ends. The strip is preferably bent so that its uniform dimension is radial and graduated dimensions axial. This magnet is permanently magnetized in a radial direction as shown in Fig. 1 with one pole N outside and the other pole S inside. The material is polarized to have a uniform flux density or strength per unit area but since the area is not uniform, the magnet will be strongest at the center 11 and will have a uniform decrease in magnetic strength in both directions from center until the ends at the opening 12 in the circle are approached. Pivoted at the center 13 of the circle outlined by the magnet 10 is another permanent magnet 14 which is preferably but not necessarily of bar shape. The rotary magnet is polarized to have its magnetic axis diametrically of the circle and axis of rotation, or in the case of a bar magnet, pivoted at its center as shown in Fig. 1, along its major axis. The length of the magnet 14 is somewhat less than the inner diameter of the circle outlined by the circular magnet.

It is now evident that the radial south pole throughout the length of the inside of the circular magnet will attract the north pole of the pivoted magnet and repel its south pole. Since the south pole of the circular magnet is strongest or has greatest flux at its center 11 and is weakest at the opening 12, the pivoted magnet will rotate until its north pole end is opposite center 11 of the circular magnet. For instance, in the position shown in Fig. 1, there is a clockwise torque on the rotor magnet as indicated by the arrows. Since this torque is proportional to the rate of change of radial cross-sectional area of the circular magnet, it is uniform over a large part of the 360 degrees except as the rotary magnet approaches near to the neutral position. If magnet 14 has its position reversed in Fig. 1, this uniform torque will be counterclockwise instead of clockwise. Thus it is possible to provide a substantially uniform torque in this way over arcs of about 100 degrees in opposite directions.

Also, the torque can be graduated or tailored from the constant value described by departing from the uniform rate of change in cross-section of the circular magnet, and in Fig. 3, I have shown the development of a magnet where the cross-section from center varies nonuniformly but symmetrically, and in Fig. 3a, a shape is shown which is nonsymmetrical both with respect to the shape on opposite sides of the point of maximum cross-section and with respect to the off-center point of maximum cross-section. If this magnet is used in Fig. 1, the rotary magnet will have a zero torque position at about point 15 because of the torque effect at the open ends of the circle. Such auxiliary torque device is useful in indicating instruments for obtaining a pull-off torque, a zero return torque, to modify the scale distribution, etc. It will of course be evident that further variations in torque can be obtained by positioning the magnet 10 off center with respect to the armature 14 and by oval or noncircular-shaped magnets 10.

It should be mentioned that a permanent magnet material should be used for the curved magnet that has high coercive force and low permeability, and preferably, a material that can be readily bent as described. One material which is suitable and which will not have its permanent magnetism knocked down by the rotor magnet is the silver-aluminum manganese alloy described in United States Letters Patent to Faus No. 2,247,804, July 1, 1941.

In Fig. 4 I have shown an electrical measuring instrument which may comprise the receiver of a telemetering system and to which my invention is applied to provide zero return and pull-off torque. Also, the permanent rotor magnet previously described is also the armature of the receiver. The instrument has two stationary radial axis coils 16 and 17 energized differentially from a direct-current source 18 in accordance with the position of a transmitter member which moves to contact 19 along a resistance 20. Assuming the coils 16 and 17 produce N pole fluxes adjacent the armature 14, the south pole of such polarized armature will be attracted and will swing toward that coil 17 most strongly energized at the moment, and will take various positions between the coils as the relative amount of current in the two coils is varied by movement of the transmitter brush 19. The pointer 21 moving over a scale 22 will be deflected accordingly. This merely represents the essential elements of one common form of electrical measuring instrument to which my invention may be applied. My auxiliary torque device has the coaxial armature 14 as its rotor magnet and thus this magnet performs a double function. The stationary C-shaped permanent magnet 10 of my auxiliary torque device has its enlarged center 11 oriented so that if and when the north pole of armature 14 is attracted opposite point 11, the pointer indication will be off-scale below the zero end thereof and will have a position at line 23. Thus in case power fails so that the coils 16 and 17 are without current for any reason, the pointer 21 will be pulled off-scale and will not give a false indication. It is also noted that the auxiliary torque is in a counterclockwise direction to return the pointer 21 toward zero from any point on the scale and may thus serve as a uniform zero return torque, or made non-uniform as previously explained, to improve the scale distribution. Thus when contact arm 19 is in a zero position near the right of resistance 20, the instrument measuring torque will be so adjusted relative to the auxiliary torque that the pointer will be on zero. The auxiliary torque is independent of and supplemental to the instrument torque.

I have also represented at 24 a ring made of conducting material such as brass or copper fitted inside the circular magnet 10. This provides a limited amount of damping for the instrument and also some protection to the magnet 10 against demagnetization. It is not essential but its use may be desirable in some instances. As an alternative the circular magnet may be plated with a heavy coating of copper.

In Fig. 5 I have shown a direct-current instrument of the zero center type for measuring current and the direction of such current. It may be used, for example, to measure the charging or discharge current of a battery 25 and the coils 26 and 27 connected in the battery circuit in series so that the coil 26 produces a south pole adjacent the armature 14 and the coil 27 produces a north pole adjacent the armature 14 when the battery current is in one direction. In such case the pointer 21 will deflect to the left of the zero center scale 28. When the current reverses, the pointer will deflect to the right of zero. My auxiliary torque feature is here used to provide the zero center return torque and a deflection proportional to the measurement in either direction. For this purpose the large cross-sectional center 11 of the circular magnet is positioned opposite the proper pole of armature magnet 14 when at the zero center position as shown. Fig. 6 shows a partial plan view of the same instrument to show how the zero return torque may be adjusted by moving the circular magnet 10 axially toward and away from the armature magnet 14 by an adjusting device 29. It is noted that the magnet 10 has a convex curvature from its largest center part to its open ends in order to make the zero return torque increase with the deflection from zero and the instrument stable.

In any case where the armature of the instrument used is not of the polarized type and one wishes to apply my invention, a polarized magnet separated from the instrument armature along the shaft may be employed.

Instruments having stationary permanent magnet systems may employ the invention by mounting my circular permanent magnet on the instrument shaft as represented in Fig. 7. Here the C-shaped magnet 10 is mounted on the shaft and cooperates with stationary permanent magnet 30 to provide the zero return torque of the instrument and to position the instrument pointer at the zero position when no other torque is present.

In the examples given where my auxiliary torque device is combined with an instrument, it will be understood that the auxiliary torque produced is in general small as compared to the instrument torque, and these torques are in the desired relation to produce the results desired.

What I claim as new and desire to secure by Letters Patent of the United States, is:

1. An auxiliary torque device for instruments comprising a pair of permanent magnets one of which is rotatable with respect to the other about an axis of rotation, one magnet being curved substantially completely about the axis of rotation in the form of a relatively thin band and polarized radially so as to produce a magnetic field of only one polarity extending radially in a plurality of directions from the axis of rotation, said other magnet producing a diametrical magnet flield symmetrically with respect to the axis of rotation but along one axis only, the poles of opposite magnetic polarity of the last-mentioned magnet being simultaneously attracted and repelled by the magnetic field of one polarity of the curved magnet, and the force of magnetic attraction and repulsion between said magnets varying with different relatively rotary positions of said magnets so that rotary torque is developed between them in certain positions.

2. An auxiliary torque device as claimed in claim 1, in which the curved magnet is a C-shaped circular band of constant radial thickness and of varying axial thickness polarized radially at substantially uniform flux density.

3. An auxiliary torque device as claimed in claim 1, in which the curved magnet is stationary and is located outside of the other magnet.

4. An auxiliary torque device as claimed in claim 1, in which the curved magnet is in the form of a circular C-shaped band, is stationary and located externally of the other magnet with its circular arc concentric with the axis of rotation of the other magnet.

5. An auxiliary torque device as claimed in claim 1, in which the curved magnet is in the form of a substantially circular C-shaped band of uniform radial thickness and with greatest axial thickness at its center and tapering symmetrically on both sides of center toward its open ends and polarized radially at substantially uniform flux density.

6. In an instrument having a rotary permanent magnet armature member pivoted at its center establishing the axis of rotation of the instrument and polarized to produce a symmetrical diametrical flux in one axis at right angles to its axis of rotation, an auxiliary torque device for said instrument comprising a stationary C-shaped permanent magnet surrounding the axis of rotation of said instrument outside of the armature thereof, said C-shaped magnet being polarized radially so as to produce attraction with respect to one pole of said armature and repulsion with respect to the other pole of said armature, the radial flux strength of said C-shaped magnet being graduated about the axis of rotation so as to produce a rotary torque on said armature over a considerable portion of the range of rotation of said armature.

7. In an electrical measuring instrument having cooperating coil and permanent magnet members which are relatively rotatable with respect to each other about a common axis of rotation for producing electrical measurement deflection operations, the magnet producing a flux diametrically with respect to the axis of rotation of said instrument, an auxiliary torque device for said instrument comprising a C-shaped permanent magnet mounted in fixed relation to the coil member of said measuring instrument, said C-shaped permanent magnet being substantially coaxial with and surrounding the axis of rotation of said instrument and being polarized radially throughout its circular length so as simultaneously to produce repulsion torque with respect to one magnet pole of said instrument permanent magnet member and attraction torque with the other magnetic pole thereof, the flux strength of said C-shaped magnet being graduated about the axis of rotation of the instrument, and said C-shaped magnet and instrument permanent magnet member being so rotatively positioned with respect to each other as to cause the C-shaped magnet to produce desirable rotary torque on the rotary member of said instrument which is independent of and supplemental to the instrument measurement torque thereof over substantially the complete measurement range of operation of said instrument.

8. In an electrical measuring instrument having an axis of rotation established by relatively rotatable electrical measurement members one of which comprises a coil member and the other means for producing a constant unidirectional field diametrically of the axis of rotation of said instrument and means for producing a desirable auxiliary torque in said instrument comprising a C-shaped permanent magnet surrounding the axis of rotation of said instrument within the influence of the constant unidirectional field thereof, said C-shaped permanent magnet being polarized radially throughout its C-shaped length to present magnetic poles of like polarity to the opposite magnetic poles of the constant unidirectional field of said instrument, the flux strength of said C-shaped magnet being graduated along its C-shaped length and said C-shaped magnet being rotatable with respect to the constant unidirectional field producing means with the coil member of the instrument whereby said C-shaped magnet develops rotary torque with respect to such unidirectional field producing means within the measurement range of operation of said instrument.

9. In an electrical measuring instrument having a permanent magnet rotary bar armature member establishing the axis of rotation of the instrument, a pointer moved by said armature, a stationary scale cooperating with said pointer, and a stationary coil with which said armature cooperates for electrical measurement purposes when the coil is energized and an auxiliary torque pull-off magnet for moving the pointer to an off-scale position when the coil is not energized, said magnet comprising a stationary circular C-shaped band of permanent magnetic material coaxial and surrounding the axis of rotation of the instrument outside of its permanent magnet armature and within the influence of said armature, said C-shaped member being permanently magnetized in a radial direction throughout its C-shaped length so as to present a pole of one polarity to the poles of opposite magnetic polarity of the armature throughout the range of deflection of the instrument, said C-shaped magnet producing permanent magnet flux strength which is a maximum at the center yoke portion thereof and which becomes less toward its open ends, and the center of said C-shaped magnet being positioned so as to rotate the armature to an off-scale pointer position when said stationary coil is not energized.

RICHARD G. JEWELL.